United States Patent
Hwang et al.

(10) Patent No.: US 12,038,085 B2
(45) Date of Patent: Jul. 16, 2024

(54) TRANSMISSION OF WORKING VEHICLE

(71) Applicant: Daedong Corporation, Daegu (KR)

(72) Inventors: Jin Ho Hwang, Gyeongsangnam-do (KR); Cheol Young Lee, Gyeongsangnam-do (KR)

(73) Assignee: DAEDONG CORPORATION, Daegu (KR)

( * ) Notice: Subject to any disclaimer, the term of this patent is extended or adjusted under 35 U.S.C. 154(b) by 0 days.

(21) Appl. No.: 18/097,483

(22) Filed: Jan. 16, 2023

(65) Prior Publication Data

US 2023/0243420 A1    Aug. 3, 2023

(30) Foreign Application Priority Data

Jan. 28, 2022    (KR) .................. 10-2022-0013744

(51) Int. Cl.
*F16H 63/20*    (2006.01)
*F16H 61/18*    (2006.01)

(52) U.S. Cl.
CPC ............ *F16H 63/20* (2013.01); *F16H 61/18* (2013.01); *F16H 2063/208* (2013.01); *F16H 2200/0026* (2013.01)

(58) Field of Classification Search
CPC ....... F16H 2063/208; F16H 2200/0026; F16H 61/16; F16H 61/18; F16H 63/20
See application file for complete search history.

(56) References Cited

U.S. PATENT DOCUMENTS

| | | | | | |
|---|---|---|---|---|---|
| 4,373,409 | A | * | 2/1983 | Benedek | ................ F16H 57/04 74/483 K |
| 4,545,457 | A | * | 10/1985 | Iwata | .................. B60K 17/352 180/247 |

FOREIGN PATENT DOCUMENTS

| | | |
|---|---|---|
| KR | 10-1993-0016269 A | 8/1993 |
| KR | 10-2011-0008758 A | 1/2011 |

* cited by examiner

*Primary Examiner* — Charles A Fox
*Assistant Examiner* — Gregory T Prather
(74) *Attorney, Agent, or Firm* — You & IP, LLC (57) ABSTRACT

Proposed is a transmission of a working vehicle. The transmission of a working vehicle includes an ultra-low speed gearbox having an ultra-low speed shift rod which moves axially and an ultra-low speed shift fork coupled to the ultra-low speed shift rod, a sub-gearbox which operates by receiving power shifted from the ultra-low speed gearbox and has two sub-shift rods and two sub-shift forks, and a stopper which is disposed between the ultra-low speed gearbox and the sub-gearbox and limits an ultra-low speed shift stage engagement of the ultra-low speed gearbox when the sub-gearbox is engaged in a specific stage (a sub-shift highest stage), thereby preventing damage or breakage to parts of an associated transmission due to the rapid rotation of the sub-gearbox during an ultra-low speed and high load operation.

15 Claims, 12 Drawing Sheets

FIG. 1

-- Prior Art --

TRANSMISSION OF WORKING VEHICLE

CROSS REFERENCE TO RELATED APPLICATION

The present application claims priority to Korean Patent Application No. 10-2022-0013744, filed Jan. 28, 2022, the entire contents of which are incorporated herein for all purposes by this reference.

BACKGROUND OF THE INVENTION

Field of the Invention

The present disclosure relates generally to a transmission of a working vehicle. More particularly, the present disclosure relates to a transmission of a working vehicle to which an ultra-low speed shift part is added in addition to a main shift part and a sub-shift part which are generally applied to increase the width of a shift range.

Description of the Related Art

Generally, an agricultural working vehicle called "a tractor" has a similar driving principle to a general vehicle, but is different in terms of structure because the agricultural working vehicle is intended to be used in all-weather conditions for various cultivation purposes depending on working conditions or working environments. That is, the agricultural working vehicle is designed to have a structure and power output characteristics that are advantageous for performing various tasks depending on use thereof.

In performing cultivation using an agricultural working vehicle, movement speed thereof and the rotational speed of the shaft of power take off (PTO) are required to be optimally adjusted according to the soil quality of a work target to increase work efficiency and ensure uniformity of work quality. To this end, unlike a transmission applied to a general vehicle, a transmission of a working vehicle has a structure capable of realizing shifting over a wider range.

In the transmission of a working vehicle, generally, a main gearbox and a sub-gearbox are structurally connected in series inside a mission casing, and the shaft of PTO, which transmits power to the outside along with vehicle driving, is structurally connected in series to the shift shaft of an engine, directly receives power output by the engine, and can transmit the power to the outside after a predetermined shift process thereof.

In the transmission of a working vehicle, the main gearbox has a group of gears involved in forward and backward movement of a working vehicle and a group of gears for a first multi-stage shifting of power output by an engine to be responsible for the first multi-stage shifting, and the sub-gearbox plays a role in increasing the speed range of power through an additional secondary shift of a primary shifted power in the main gearbox.

A working vehicle equipped with the transmission may be required to work in an ultra-low speed state of less than 1 km/h in some cases. In this case, it is difficult to realize ultra-low speed of less than 1 km/h with only the existing shift stage combination of the main gearbox and the sub-gearbox, and thus according to the specification of the transmission, an ultra-low speed gearbox is included in the sub-gearbox, or the ultra-low speed gearbox is connected in parallel to the front or rear of the sub-gearbox separately.

Figure 1:
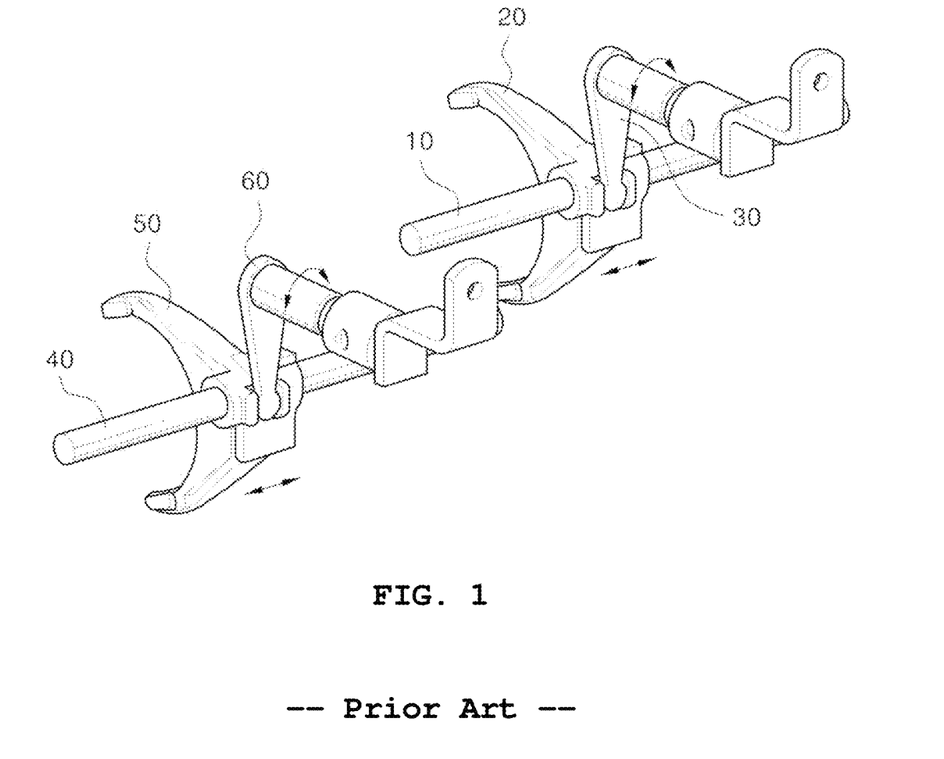
FIG. 1 is a view illustrating the configuration of a sub-gearbox and an ultra-low speed gearbox of a conventional technology connected to each other in parallel.

FIG. 1 is a view illustrating the configuration of a sub-gearbox and an ultra-low speed gearbox of a conventional technology connected to each other in parallel Referring to FIG. 1, to realize ultra-low speed shifting of less than 1 km/h, the sub-gearbox and the ultra-low speed gearbox connected to each other in parallel include a sub-shift rod 10 and an ultra-low speed shift rod 40 arranged parallel to each other. In this case, a sub-shift fork 20 and an ultra-low speed shift fork 50 are slidably mounted respectively on the outer circumferential surfaces of the sub-shift rod 10 and the ultra-low speed shift rod 40.

First sides of the sub-shift fork 20 and the ultra-low speed shift fork 50 are respectively engaged with a sub-shift shifter of the sub-gearbox which is not shown and an ultra-low speed shift shifter of the ultra-low speed gearbox which is not shown, and shift arms 30 and 60 connected with dedicated levers (not shown) are coupled respectively to second sides of the sub-shift fork 20 and the ultra-low speed shift fork 50, and thus during a sub-shift or an ultra-low speed shift operation, each of the levers can be used to realize a desired shifting.

In the transmission, when the shift combination of the sub-gearbox and the ultra-low speed gearbox is in a shift stage to realize an ultra-low speed by manipulating the lever, the shift shaft and gear of the ultra-low speed gearbox (hereinafter, referred to as "shift elements") rotate at low speeds and output high-torque shift power to a wheel, and accordingly, a vehicle is in a state in which the vehicle can perform high-load work while moving at an ultra-low speed.

However, when a large load is applied to the shift elements due to high load work in a state in which a considerable torque is applied to the shift elements since the sub-gearbox is engaged in a specific stage (a sub-shift highest stage) and the ultra-low speed gearbox is engaged in an ultra-low speed shift stage, the shift elements may be damaged or broken and thus gear shifting does not work properly or becomes impossible.

In addition, in a conventional technology, the ultra-low speed gearbox for ultra-low speed shifting, the main gearbox, and the sub-gearbox are completely mounted in a middle casing constituting the exterior of a transmission, and thus the internal structure of the transmission is complicated, thereby decreasing assemblability and mass productivity and causing the difficulty of pre- or post-maintenance.

DOCUMENTS OF RELATED ART (Patent Document 1) Korean Patent Application Publication No. 10-1993-0016269 (published on Aug. 26, 1993)
(Patent Document 2) Korean Patent Application Publication No. 10-2011-0008758 (published on Jan. 27, 2011)

SUMMARY OF THE INVENTION

Accordingly, the present disclosure has been made keeping in mind the above problems occurring in the related art, and the present disclosure is intended to propose a transmission of a working vehicle in which when a sub-gearbox is engaged in a specific stage, ultra-low speed shifting is mechanically restricted so that during an ultra-low speed and high load operation, damage or breakage to the internal parts of the transmission can be prevented.

In addition, the present disclosure is intended to propose a transmission of a working vehicle in which an ultra-low speed gearbox is configured as one module to be detachable from the transmission so that the assemblability and pre- or post-maintenance of the transmission can be improved.

In order to achieve the above objectives, according to one aspect of the present disclosure, there is provided a transmission of a working vehicle, the transmission including: an ultra-low speed gearbox having an ultra-low speed shift rod which moves axially and an ultra-low speed shift fork which is coupled to the ultra-low speed shift rod; a sub-gearbox which operates by receiving power shifted from the ultra-low speed gearbox, the sub-gearbox having a first sub-shift rod and a second sub-shift rod which move axially and are parallel to each other, and a first sub-shift fork and a second sub-shift fork which are coupled respectively to the first sub-shift rod and the second sub-shift rod; and a stopper which is disposed between the ultra-low speed gearbox and the sub-gearbox, the stopper being configured to limit an ultra-low speed shift stage engagement of the ultra-low speed gearbox by operating in cooperation with a specific stage shifting of the sub-gearbox.

Here, when the sub-gearbox is engaged in a sub-shift highest stage of sub-shift stages at which the sub-shift output shaft is rotated at the fastest speed, the stopper may limit the ultra-low speed shift stage engagement of the ultra-low speed gearbox.

For example, the stopper may operate to restrict or derestrict the axial movement of the ultra-low speed shift rod by operating in cooperation with the movement of the first sub-shift rod involved in the specific stage shifting. In this case, the stopper may restrict or derestrict the axial movement of the ultra-low speed shift rod while rotating according to the axial movement of the first sub-shift rod.

Preferably, the stopper may include: a round bar part having a first side rotatably coupled to a predetermined position of a middle casing; a connecting arm configured to be integrated with a second side of the round bar part, the connecting arm being connected to one side of the first sub-shift rod so that the round bar part operates in cooperation with the first sub-shift rod; and a shift limit rod installed on a position of the round bar part located at a predetermined distance from the connecting arm and aligned with the ultra-low speed shift rod at a specific rotational position, the shift limit rod being configured to permit or limit the movement of the ultra-low speed shift rod to a position of the ultra-low speed shift stage engagement.

The ultra-low speed gearbox applied to the present disclosure may further include: an output shaft; an ultra-low speed shift shaft arranged parallel to the output shaft; a plurality of gears installed respectively to the output shaft and the ultra-low speed shift shaft; and an ultra-low speed shift shifter which is installed between the plurality of gears of the output shaft and is engaged with the ultra-low speed shift fork.

In this case, the output shaft on which the plurality of gears and the ultra-low speed shift shifter are installed, the ultra-low speed shift shaft on which the plurality of gears is installed, and the ultra-low speed shift rod coupled with the ultra-low speed shift fork engaged with the ultra-low speed shift shifter may be mounted to a base having at least two support parts so that the ultra-low speed gearbox is configured as one module.

Particularly, an ultra-low speed gearbox mounting part having an opening of a size corresponding to the base is formed on one side part of a middle casing constituting an exterior of the transmission, and the ultra-low speed gearbox configured as one module is detachably mounted on the ultra-low speed gearbox mounting part.

According to the transmission of a working vehicle according to the embodiment of the present disclosure, when the sub-gearbox is engaged in a specific stage, the stopper is configured to operate and mechanically restrict ultra-low speed shifting, thereby preventing damage or breakage to the internal parts of the transmission which may occur when the ultra-low speed shifting is allowed in a state in which the sub-gearbox is engaged in a specific stage (a highest stage).

In addition, according to the transmission of a working vehicle according to the embodiment of the present disclosure, the ultra-low speed gearbox can be configured as one module to be detachable from the transmission, thereby significantly improving the assemblability and pre- or post-maintenance of the transmission, and can be selectively attached thereto and used only when ultra-low speed shifting is required according to the type of work, thereby increasing the operation efficiency of the transmission.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, an exemplary embodiment of the present disclosure will be described in detail with reference to the accompanying drawings.

Terms used in this specification are used only to describe the specific embodiment, and are not intended to limit the present disclosure. Singular expressions include plural expressions unless the context clearly dictates otherwise.

It should be understood that terms "comprise", "include", "have", etc. used in this specification specify the presence of stated features, integers, steps, operations, elements, components, and/or combinations thereof but do not preclude the presence or addition of one or more other features, integers, steps, operations, elements, components, and/or combinations thereof.

In addition, although terms such as first and second, etc. may be used herein to describe various elements, the elements should not be limited by these terms. These terms are only used to distinguish one element from another element.

Additionally, a term such as " . . . part", " . . . unit", and " . . . module" described in the specification means a unit in which at least one function or operation is processed, and may be implemented by hardware or software or a combination of hardware and software.

In description with reference to the accompanying drawings, the same reference numerals will be given to the same components, and overlapping descriptions thereof will be omitted. In addition, in describing the present disclosure, when it is determined that a detailed description of a related known technology may unnecessarily obscure the gist of the present disclosure, the detailed description will be omitted.

Figure 2:
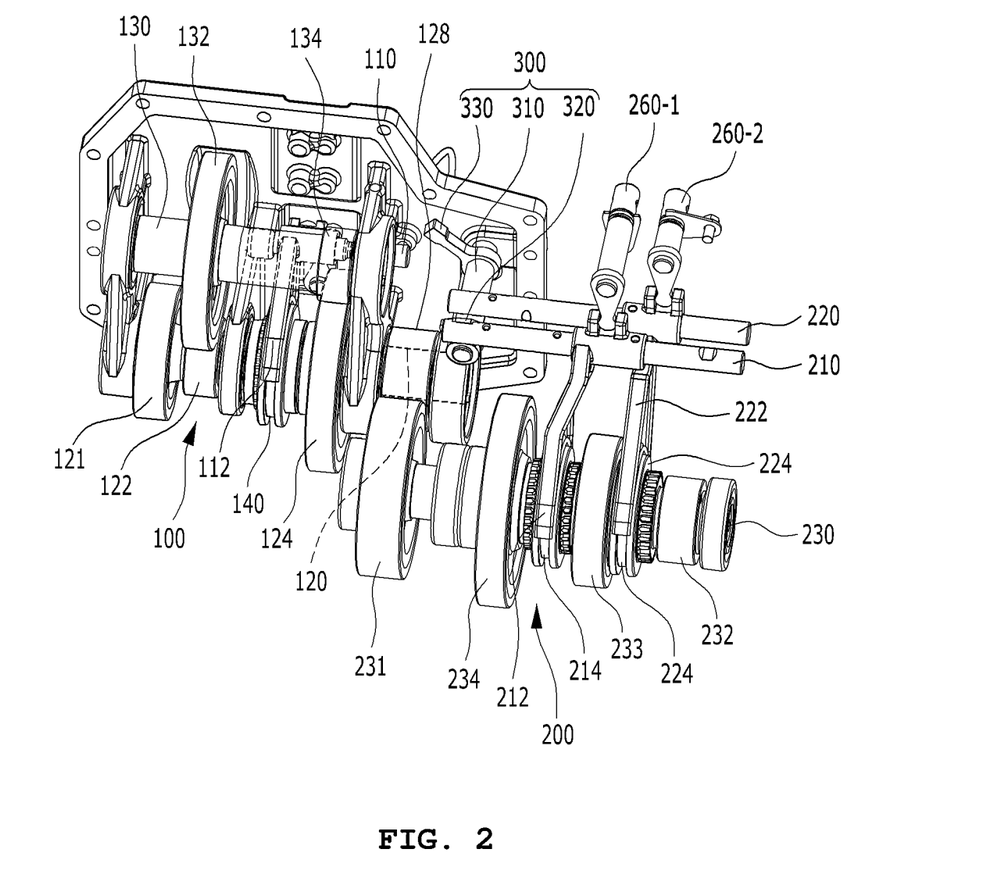
FIG. 2 is a perspective view illustrating the configuration and interconnection of a sub-gearbox and an ultra-low speed gearbox in detail in a transmission of a working vehicle according to an embodiment of the present disclosure.
Figure 3A:
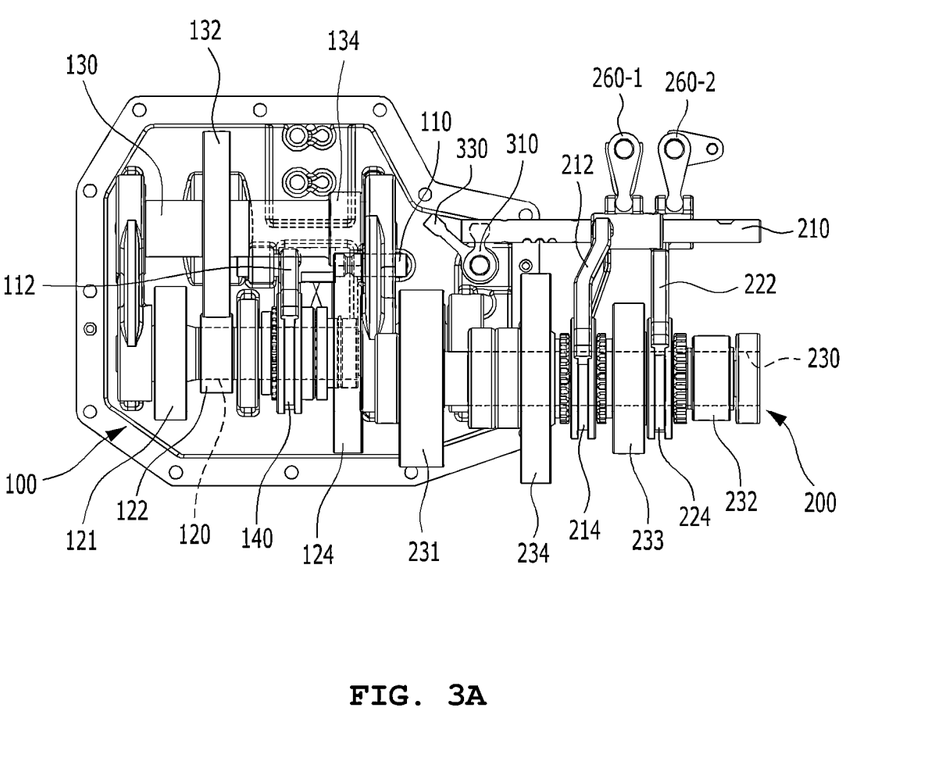
FIGS. 3A and 3B respectively are a front view and a top plan view of the configuration illustrated in FIG. 2.
Figure 3B:
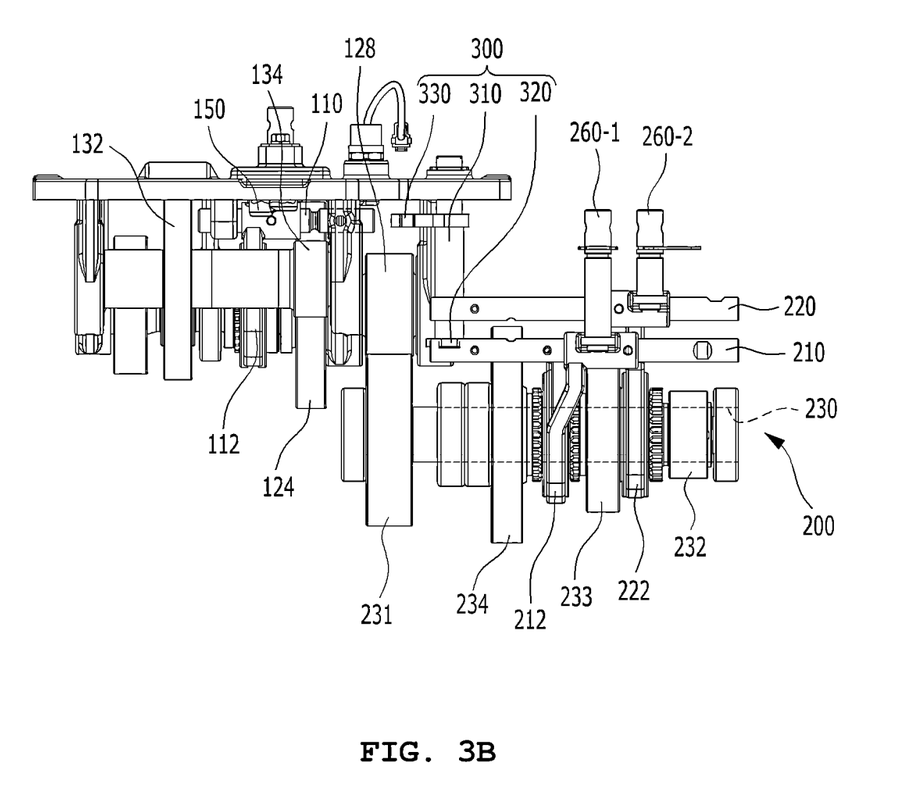
Figure 4:
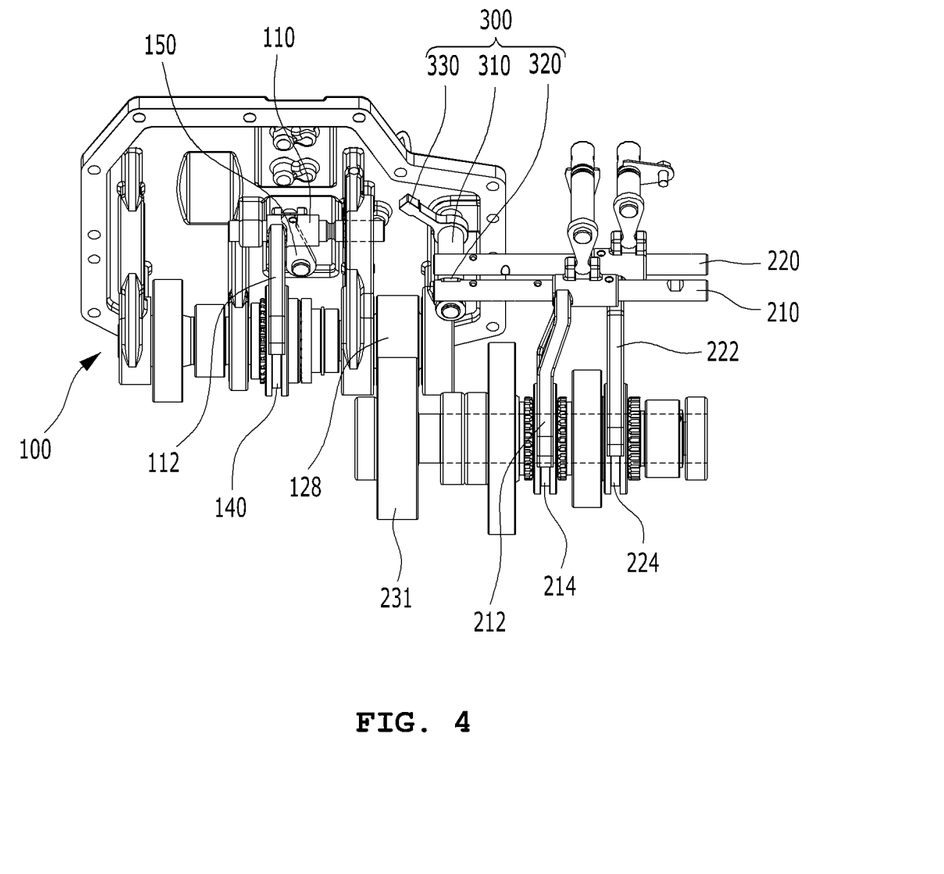
FIG. 4 is a perspective view illustrated by omitting a component (an ultra-low speed shift shaft of the ultra-low speed gearbox) in FIG. 2 to show main components of the present disclosure.
Figure 5:
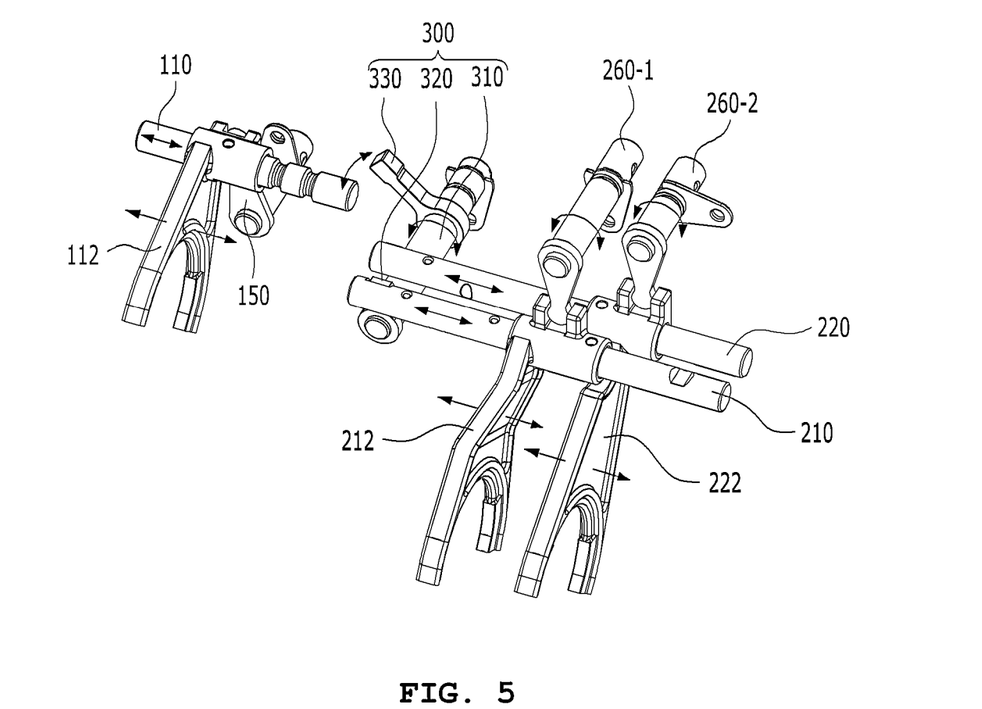
FIG. 5 is a perspective view illustrated by extracting main components of the present disclosure in FIG. 2.

FIG. 2 is a perspective view illustrating the configuration and interconnection of a sub-gearbox and an ultra-low speed gearbox in detail in a transmission of a working vehicle according to the embodiment of the present disclosure; FIGS. 3A and 3B respectively are a front view and a top plan view of the configuration illustrated in FIG. 2. In addition, FIG. 4 is a perspective view illustrated by omitting a component (an ultra-low speed shift shaft of the ultra-low speed gearbox) in FIG. 2 to show main components of the present disclosure, and FIG. 5 is a perspective view illustrated by extracting main components of the present disclosure in FIG. 2.

Referring to FIGS. 2 to 5, the transmission 1 of a working vehicle according to the embodiment of the present disclosure includes the ultra-low speed gearbox 100 and the sub-gearbox 200. The ultra-low speed gearbox 100 performs a second shifting (ultra-low speed shifting) by receiving a first shifted power from a main gearbox which is not shown, and the sub-gearbox 200 performs an additional third multi-stage shifting for power output from the ultra-low speed gearbox 100.

The ultra-low speed gearbox 100 functions to perform a second ultra-low speed shifting of power (the first shifted power) shifted from the main gearbox which is not shown. The ultra-low speed gearbox 100 includes an ultra-low speed shift rod 110 and an ultra-low speed shift fork 112 coupled to the ultra-low speed shift rod 110 which are capable of moving axially. In addition, the ultra-low speed gearbox 100 includes an output shaft 120 and the ultra-low speed shift shaft 130 parallel thereto.

An input gear 121 of an end of the output shaft 120 engages with a main shift output gear (not shown) of an end of a main shift output shaft, and thus a first shift power by the main gearbox is input to the ultra-low speed gearbox 100, and the input power may be output to the sub-gearbox 200 at the rear of the ultra-low speed gearbox 100 after shifting once again (ultra-low speed shifting) according to the state of the ultra-low speed gearbox 100 manipulated by the driver or may be output to the sub-gearbox 200 without the additional second shifting.

For ultra-low speed shifting, two pairs of gears are installed respectively on the output shaft 120 and the ultra-low speed shift shaft 130. One pair of the two pairs of gears includes a first drive gear 122 provided on the output shaft 120 and a first driven gear 132 which is engaged with the first drive gear 122 and is disposed on the ultra-low speed shift shaft 130, and the other pair includes a second drive gear 134 located away by a predetermined distance from the first driven gear 132 and installed on the ultra-low speed shift shaft 130, and a second driven gear 124 which is engaged with the second drive gear 134 and is disposed on the output shaft 120

The first drive gear 122 is configured to be integrated with the input gear 121, and the first drive gear 122 and the second driven gear 124 are installed on the output shaft 120 via a bearing (a reference numeral omitted) and are free from rotation of the output shaft 120, and the first driven gear 132 and the second drive gear 134 are integrally rotatably coupled to the ultra-low speed shift shaft 130, and thus the first driven gear 132, the ultra-low speed shift shaft 130, and the second drive gear 134 perform synchronized rotations, that is, rotational movements in the same direction and at the same speed.

The ultra-low speed shift fork 112 of the ultra-low speed gearbox 100 is engaged with an ultra-low speed shift shifter 140 installed on the output shaft 120 between the first drive gear 122 and the second driven gear 124. In this case, the ultra-low speed shift shifter 140 is slidably coupled to the output shaft 120 by having a spline structure, and moves along the output shaft 120 by the axial movement of the ultra-low speed shift rod 110 according to the manipulation of an ultra-low speed shift lever (not shown) to synchronize the output shaft 120 with one of the first drive gear 122 and the second driven gear 124.

For example, when the ultra-low speed shift shifter 140 is engaged with the second driven gear 124 (ultra-low speed shifting ON) by the manipulation of the ultra-low speed shift lever, power input through the input gear 121 is sequentially transmitted to the first drive gear 122, the first driven gear 132 and the ultra-low speed shift shaft 130, the second drive gear 134, the second driven gear 124, the ultra-low speed shift shifter 140, and the output shaft 120, and in the process, shifting (ultra-low speed shifting) is performed according to a gear ratio of the first drive gear 122 and the first driven gear 132, and a gear ratio of the second drive gear 134 and the second driven gear 124.

Unlike this, when the ultra-low speed shift shifter 140 engages with the first drive gear 122 (when ultra-low speed shifting is off), the first drive gear 122 and the output shaft 120 are synchronized through the ultra-low speed shift shifter 140, and thus power is transmitted from the first drive gear 122 directly to the output shaft 120, and without a separate shift (ultra-low speed shifting), is transmitted to the sub-gearbox 200 through an ultra-low speed output gear 128 integrally rotatably coupled to the output shaft 120.

For reference, when the ultra-low speed shifting is off, the first driven gear 132 is engaged with the first drive gear 122 rotationally synchronized with the output shaft 120 and thus the ultra-low speed shift shaft 130 and the second drive gear 134 also rotate, but since the second driven gear 124 engaged with the second drive gear 134 and located on the output shaft 120 is free to rotate relative to the output shaft 120, the ultra-low speed shift shaft 130 rotates idly.

In FIGS. 3A, 3B, 4, and 5, a reference numeral 150 refers to an ultra-low speed shift arm which connects the ultra-low speed shift lever not shown and the ultra-low speed shift rod 110 described above to each other such that the ultra-low speed shift lever not shown and the ultra-low speed shift rod 110 can operate in cooperation with each other.

The sub-gearbox 200 includes a first sub-shift rod 210 and a second sub-shift rod 220 parallel to each other. A first sub-shift fork 212 and a second sub-shift fork 222 are respectively coupled to the first sub-shift rod 210 and the second sub-shift rod 220. The first sub-shift fork 212 and the second sub-shift fork 222 engage with a first sub-shift shifter 214 and a second sub-shift shifter 224, respectively.

The first sub-shift shifter 214 and the second sub-shift shifter 224 are slidably coupled to a sub-shift shaft 230 by having spline structures while the first sub-shift shifter 214 and the second sub-shift shifter 224 are spaced apart by a distance from each other, and operation grooves (a reference numeral omitted) into which shift arms 260-1 and 260-2 operating in cooperation with a sub-shift lever (not shown) are inserted are formed in the first sub-shift rod 210 and the second sub-shift rod 220, respectively.

In this case, inside a middle casing, each of the first sub-shift rod 210 and the second sub-shift rod 220 is configured to perform a rectilinear movement in an axial direction thereof (a longitudinal direction of each of the sub-shift rods).

Due to such a configuration, one of the shift arms 260-1 and 260-2 is rotated by manipulating the sub-shift lever, a sub-shift rod 210 or 220 coupled to a shift arm (one of 260-1 and 260-2) rotating moves in an axial direction, and the sub-shift fork of an associated sub-shift rod is engaged in or disengaged from a specific sub-shift stage as the sub-shift shifter engaged with the sub-shift fork moves.

While each of the first sub-shift shifter 214 and the second sub-shift shifter 224 moves along the sub-shift shaft 230, the first sub-shift shifter 214 and the second sub-shift shifter 224 connect one of a plurality of sub-shift gears 232 to 234 installed rotatably on the sub-shift shaft 230 with the sub-shift shaft 230 to perform power transmission therebetween or disconnect one of a plurality of sub-shift gears 232 to 234 from the sub-shift shaft 230.

For example, when the first sub-shift shifter 214 is engaged with a highest stage sub-shift gear 234 by manipulating the sub-shift lever, the rotations of the highest stage sub-shift gear 234 and the sub-shift shaft 230 are synchronized through the first sub-shift shifter 214, and thus power input through a sub-shift input gear 231 may be transmitted through the sub-shift shaft 230 and the highest stage sub-shift gear 234 synchronized therewith to a sub-shift output shaft which is not shown.

The transmission 1 of a working vehicle according to the embodiment of the present disclosure further includes a stopper 300 disposed between the sub-gearbox 200 and the ultra-low speed gearbox 100. When the sub-gearbox 200 is engaged in a specific stage, the stopper 300 restricts the ultra-low speed gearbox 100 from being engaged in an ultra-low speed shift stage, thereby preventing damage or breakage to the internal parts of the transmission during an ultra-low speed and high load operation.

More specifically, when the sub-gearbox 200 is engaged in a sub-shift highest stage, at which the sub-shift output shaft rotates at the highest speed, among the sub-shift stages (when the first sub-shift shifter 214 is engaged in the highest sub-shift stage 234), the stopper 300 functions to mechanically block the shifting of the ultra-low speed gearbox 100 to the ultra-low speed shift stage.

Figure 6:
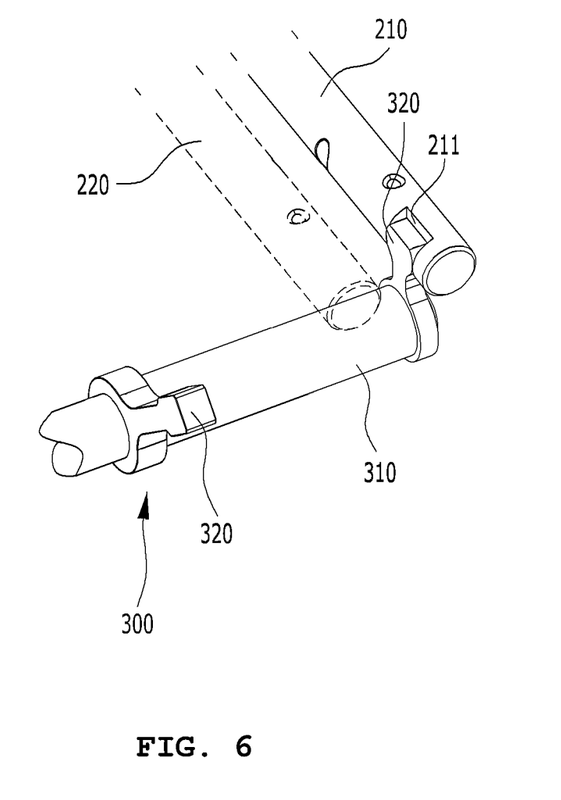
FIG. 6 is an enlarged perspective view of a portion at which a stopper and the sub-gearbox are connected to each other.

FIG. 6 is an enlarged perspective view of a portion at which the stopper and the sub-gearbox are connected to each other.

Referring to FIG. 6, the stopper 300 is interlockably connected to a specific sub-shift rod involved in a specific stage shifting (a sub-shift lowest stage) among two sub-shift rods. The specific sub-shift rod may be the first sub-shift rod 210 as illustrated in the drawing. In this case, the stopper 300 may operate in cooperation with the axial movement of the first sub-shift rod 210 so that the axial movement of the ultra-low speed shift rod 110 is restricted or derestricted.

The stopper 300 may be configured to rotate according to the rectilinear movement of the first sub-shift rod 210 so that the axial movement of the ultra-low speed shift rod 110 is mechanically restricted or derestricted.

To this end, the stopper 300 includes a round bar part 310 and a connecting arm 320 and a shift limit rod 330 which are respectively provided integrally on an end and a middle of the round bar part 310, and when seen from the front side of the round bar part 310, the connecting arm 320 and the shift limit rod 330 may be configured to have a predetermined angle therebetween (an angle between approximately 70 and 90 degrees).

A first side of the round bar part 310 may be rotatably coupled to a predetermined position of one side wall of the middle casing 2, and the connecting arm 320 may be configured to be integrated with a second side of the round bar part 310. An end part of the connecting arm 320 may be pivotally coupled to a coupling recess 211 of one side of the first sub-shift rod 210. In addition, the shift limit rod 330 may be configured to extend outward at a right angle from a position of the round bar part 310 located at a predetermined distance from the connecting arm 320.

Figure 7A:
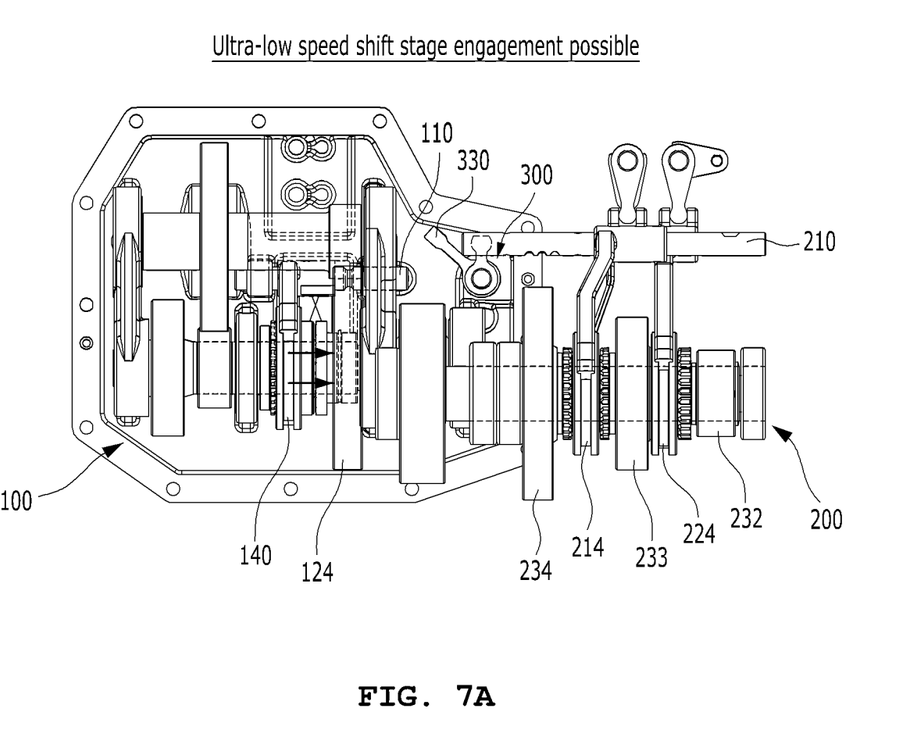
FIGS. 7A and 7B are views illustrating the operation state of main components of the transmission according to the embodiment of the present disclosure.
Figure 7B:
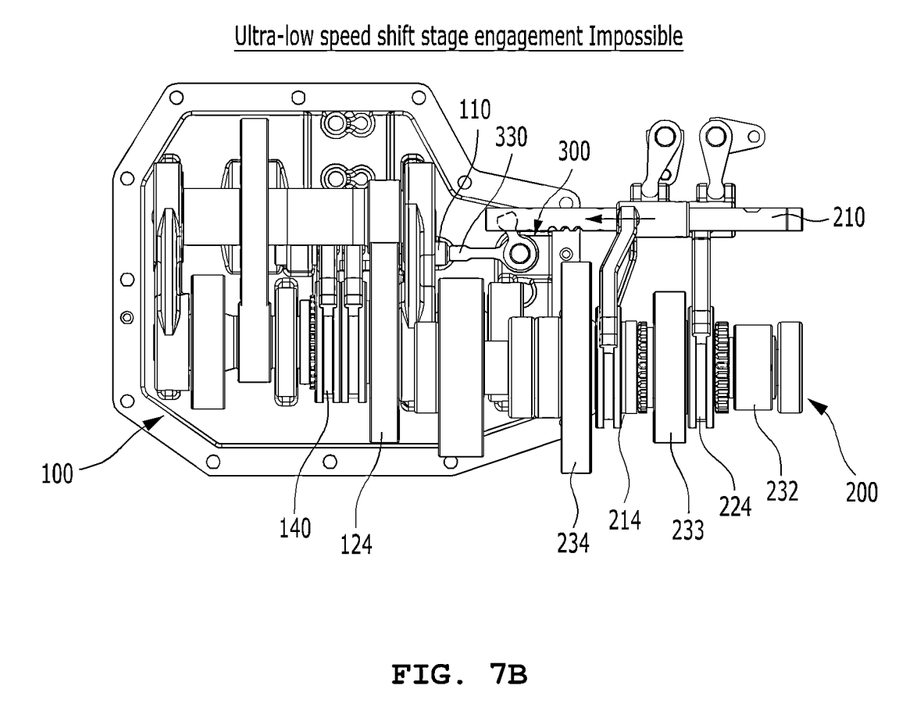

FIGS. 7A and 7B illustrate the operation state of main components of the transmission according to the embodiment of the present disclosure, and FIG. 7A is a view illustrating a state in which main components are arranged before the first sub-shift rod involved in a specific stage shifting (the sub-shift lowest stage) among the sub-shift rods moves to the position of the specific stage shifting, and FIG. 7B illustrates a state in which main components are arranged when the first sub-shift rod is moved to the position of the specific stage shifting.

Before the first sub-shift rod 210 involved in a specific stage shifting (the sub-shift highest stage) moves to the position of the specific stage shifting (the sub-shift highest stage) (when the sub-gearbox 200 is in a neutral position, or when the first sub-shift rod 210 or the second sub-shift rod 220 is moved to a position of a shift stage subordinate to the specific stage), the shift limit rod 330 constituting the stopper 300 and the ultra-low speed shift rod 110 of the ultra-low speed gearbox 100 are completely spaced apart from each other by being in disagreement with each other as illustrated in FIG. 7A.

In this arrangement, the ultra-low speed shift rod 110 may freely move to an ultra-low speed shift position (a position at which the ultra-low speed shift shifter 140 is engaged with the second driven gear 124). Accordingly, in the state of FIG. 7A, when the ultra-low speed shift lever is manipulated toward the ultra-low speed shift stage, the ultra-low speed shift rod 110 and the ultra-low speed shift shifter 140 connected thereto are moved to the ultra-low speed shift position, and thus may be engaged in the ultra-low speed shift stage.

Unlike this, when the first sub-shift rod 210 involved in a specific stage shifting is moved to a position of a specific stage (the sub-shift highest stage) by the manipulation of the sub-shift lever, as illustrated in FIG. 7B, the shift limit rod 330 constituting the stopper 300 is aligned with the ultra-low speed shift rod 110 with a slight gap therebetween, and accordingly, the shift limit rod 330 blocks the ultra-low speed shift rod 110 in front of the same such that the ultra-low speed shift rod 110 does not move to the ultra-low speed shift position.

Accordingly, when the sub-gearbox 200 is engaged in the specific stage (the sub-shift highest stage) by the manipulation of the sub-shift lever, the ultra-low speed gearbox 100 cannot mechanically implement ultra-low speed shifting due to the stopper 300, and as a result, it is possible to solve several problems (damage or breakage to gearshift elements) which may occur when the ultra-low speed shifting is allowed while the sub-gearbox 200 is engaged in the specific stage (the highest stage).

Figure 8:
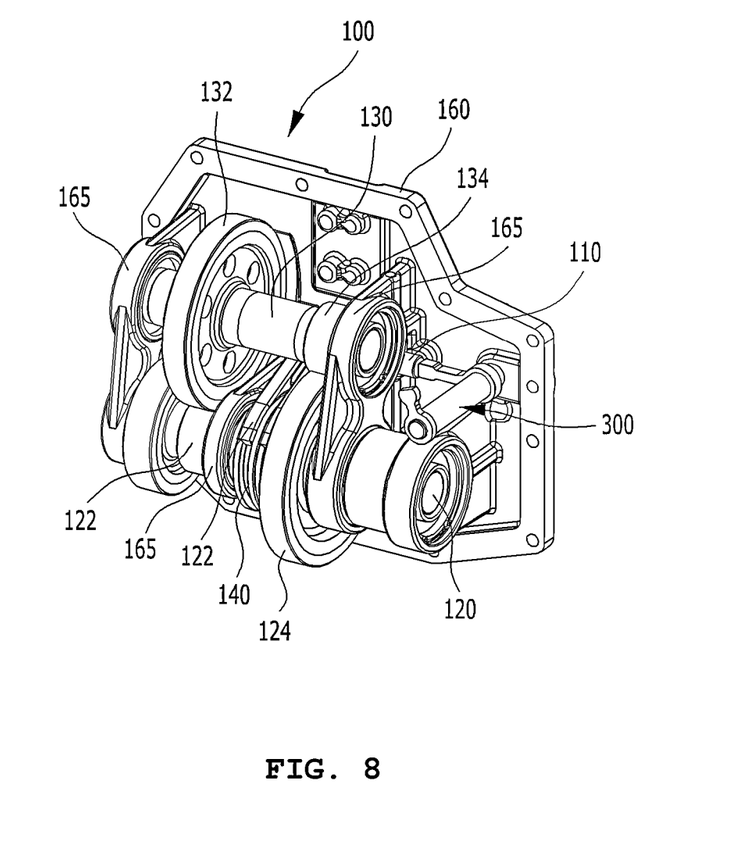
FIG. 8 is a perspective view illustrated by separately extracting only the ultra-low speed gearbox in FIG. 2.
Figure 9:
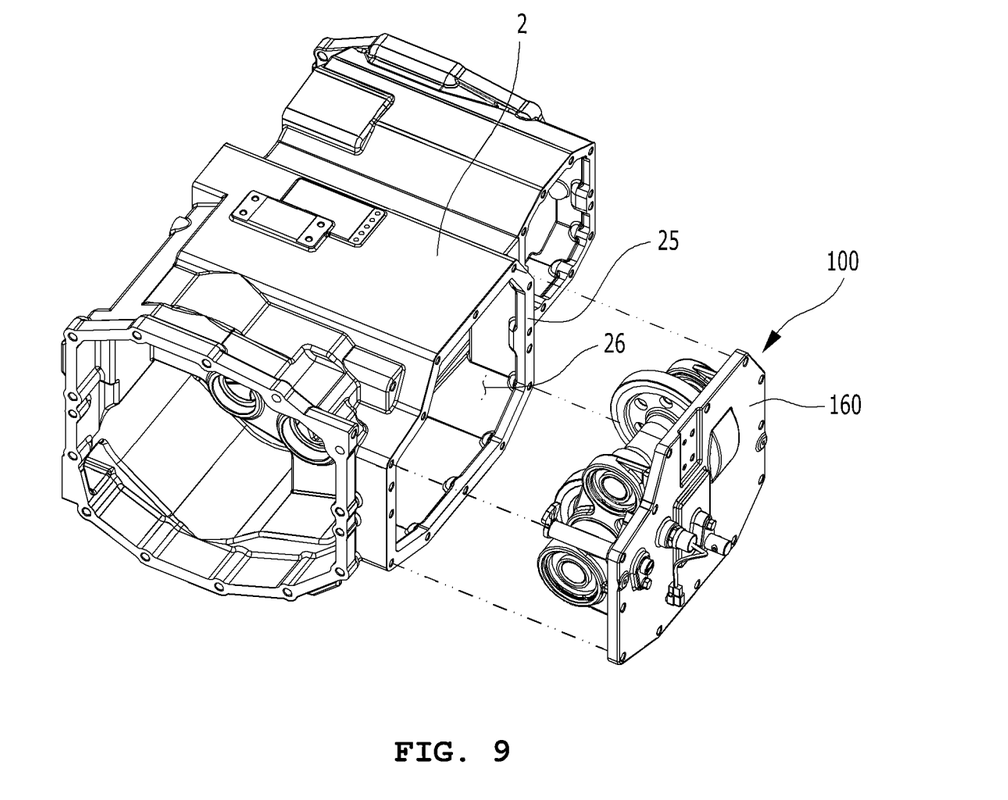
FIG. 9 is a perspective view illustrating how the ultra-low speed gearbox having a configuration as illustrated in FIG. 8 is mounted to a middle casing of the transmission according to the embodiment of the present disclosure.

Meanwhile, FIG. 8 is a perspective view illustrated by separately extracting only the ultra-low speed gearbox in FIG. 2, FIG. 9 is a perspective view illustrating how the ultra-low speed gearbox having a configuration as illustrated in FIG. 8 is mounted to the middle casing of the transmission according to the embodiment of the present disclosure. In addition, FIG. 10 is a view illustrating the transmission to which the ultra-low speed gearbox having the configuration as illustrated in FIG. 8 is mounted.

Figure 10:
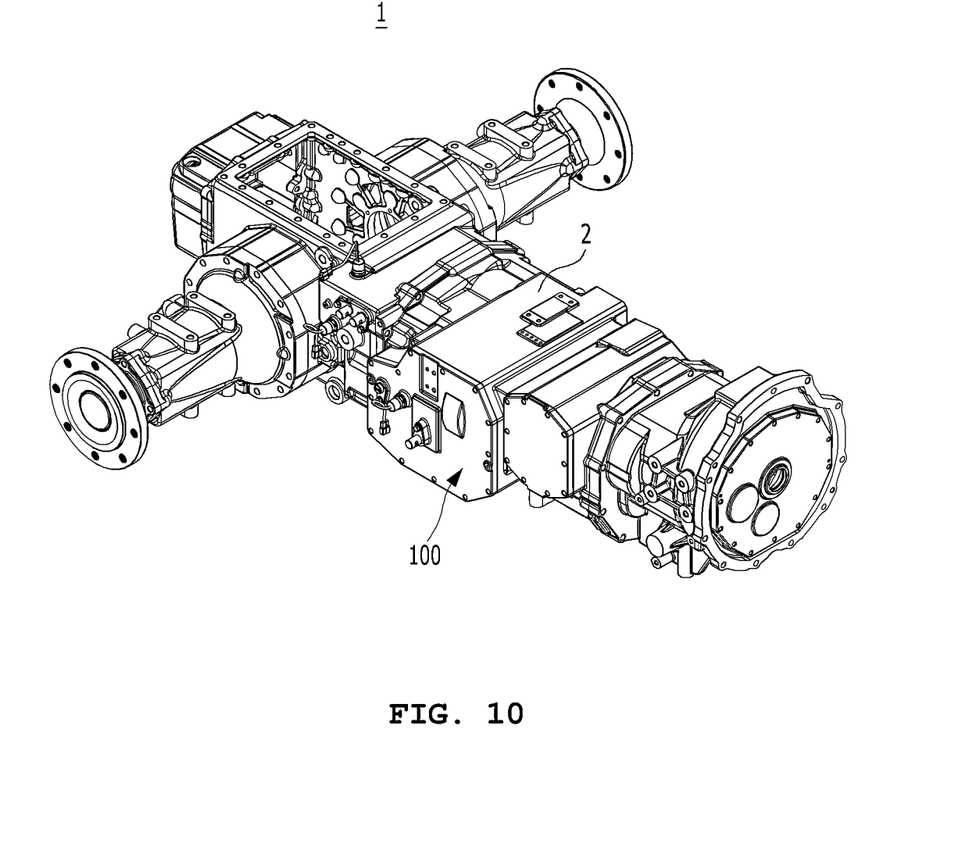
FIG. 10 is a view illustrating the transmission of a working vehicle after the mounting of the ultra-low speed gearbox having the configuration as illustrated in FIG. 8.

The ultra-low speed gearbox 100 applied to the transmission 1 of a working vehicle according to the embodiment of the present disclosure is configured as one module through a base 160 as illustrated in FIG. 8, and is detachably assembled with one side part of the middle casing 2 constituting the exterior of the transmission as illustrated in FIG. 9 to be installed (assembled with the transmission through the one side part of the middle casing) as illustrated in FIG. 10.

As described above, modularization of the ultra-low speed gearbox 100 may be realized through the base 160, and in this case, the base 160 may include at least two support parts 165 having structures by which the output shaft 120 on which a plurality of gears 122 and 124 and the ultra-low speed shift shifter 140 are installed, the ultra-low speed shift shaft 130 on which a plurality of gears 132 and 134 is installed, the ultra-low speed shift rod 110 which is engaged with the ultra-low speed shift shifter 140 and is coupled to the ultra-low speed shift fork 112 can be rotatably supported.

In addition, for the mounting of the modularized ultra-low speed gearbox 100, an ultra-low speed gearbox mounting part 25 having an opening 26 of a size corresponding to the base 160 may be formed on the one side part of the middle casing 2. Accordingly, the ultra-low speed gearbox 100 of a modularized structure may be detachably assembled with the middle casing 2 through the ultra-low speed gearbox mounting part 25.

According to the transmission of a working vehicle according to the embodiment of the present disclosure described above, when the sub-gearbox is engaged in a specific stage, the stopper is configured to operate and mechanically restrict ultra-low speed shifting, thereby preventing damage or breakage to the internal parts of the transmission which may occur when the ultra-low speed shifting is allowed in a state in which the sub-gearbox is engaged in a specific stage (a highest stage).

In addition, according to the transmission of a working vehicle according to the embodiment of the present disclosure, the ultra-low speed gearbox can be configured as one module to be detachable from the transmission, thereby significantly improving the assemblability and pre- or post-maintenance of the transmission, and can be selectively attached thereto and used only when ultra-low speed shifting is required according to the type of work, thereby increasing the operation efficiency of the transmission.

In the above detailed description of the present disclosure, only the specific embodiment has been described. However, it should be understood that the present disclosure is not limited to the specific embodiment mentioned in the detailed description but includes all modifications, equivalents and substitutes within the spirit and scope of the present disclosure as defined by the appended claims.

What is claimed is:

1. A transmission of a working vehicle, the transmission comprising:
    an ultra-low speed gearbox having an ultra-low speed shift rod which moves axially and an ultra-low speed shift fork which is coupled to the ultra-low speed shift rod, wherein the ultra-low speed gearbox performs a ultra-low speed shifting by receiving power from a main gearbox which performs a first speed shifting;
    a sub-gearbox which is driven by the power transmitted from the ultra-low speed gearbox, the sub-gearbox having a first sub-shift rod and a second sub-shift rod which move axially and are parallel to each other, and a first sub-shift fork and a second sub-shift fork which are coupled respectively to the first sub-shift rod and the second sub-shift rod; and
    a stopper which is disposed between the ultra-low speed gearbox and the sub-gearbox, the stopper being configured to prevent an ultra-low speed shift stage engagement of the ultra-low speed gearbox by blocking an axial movement of the ultra-low speed shift rod at an end of the ultra-low speed shift rod when the first sub-shift rod moves to engage in a predetermined sub-shift stage of sub-shift stages.

2. The transmission of claim 1, wherein the predetermined sub-shift stage is a sub-shift highest stage of the sub-shift stages.

3. The transmission of claim 2, wherein the stopper comprises:
    a round bar part having a first side rotatably coupled to a predetermined position of a middle casing;
    a connecting arm configured to be integrated with a second side of the round bar part, the connecting arm being connected to one side of the first sub-shift rod so that the round bar part operates in cooperation with the first sub-shift rod; and
    a shift limit rod installed on a position of the round bar part located at a predetermined distance from the connecting arm, the shift limit rod being configured to permit or prevent the axial movement of the ultra-low speed shift rod to a position of the ultra-low speed shift stage engagement.

4. The transmission of claim 3, wherein the shift limit rod is aligned with the ultra-low speed shift rod to prevent the axial movement of the ultra-low speed shift rod to the position of the ultra-low speed shift stage engagement.

5. The transmission of claim 1, wherein the first sub-shift rod is involved in a sub-shift highest stage of the sub-shift stages.

6. The transmission of claim 5, wherein the stopper comprises:
    a round bar part having a first side rotatably coupled to a predetermined position of a middle casing;
    a connecting arm configured to be integrated with a second side of the round bar part, the connecting arm being connected to one side of the first sub-shift rod so that the round bar part operates in cooperation with the first sub-shift rod; and
    a shift limit rod installed on a position of the round bar part located at a predetermined distance from the connecting arm, the shift limit rod being configured to permit or prevent the axial movement of the ultra-low speed shift rod to a position of the ultra-low speed shift stage engagement.

7. The transmission of claim 6, wherein the shift limit rod is aligned with the ultra-low speed shift rod to prevent the axial movement of the ultra-low speed shift rod to the position of the ultra-low speed shift stage engagement.

8. The transmission of claim 1, wherein the stopper is configured to rotate according to an axial movement of the first sub-shift rod.

9. The transmission of claim 8, wherein the stopper comprises:
a round bar part having a first side rotatably coupled to a predetermined position of a middle casing;
a connecting arm configured to be integrated with a second side of the round bar part, the connecting arm being connected to one side of the first sub-shift rod so that the round bar part operates in cooperation with the first sub-shift rod; and
a shift limit rod installed on a position of the round bar part located at a predetermined distance from the connecting arm, the shift limit rod being configured to permit or prevent the axial movement of the ultra-low speed shift rod to a position of the ultra-low speed shift stage engagement.

10. The transmission of claim 9, wherein the shift limit rod is aligned with the ultra-low speed shift rod to prevent the axial movement of the ultra-low speed shift rod to the position of the ultra-low speed shift stage engagement.

11. The transmission of claim 1, wherein the stopper comprises:
a round bar part having a first side rotatably coupled to a predetermined position of a middle casing;
a connecting arm configured to be integrated with a second side of the round bar part, the connecting arm being connected to one side of the first sub-shift rod so that the round bar part operates in cooperation with the first sub-shift rod; and
a shift limit rod installed on a position of the round bar part located at a predetermined distance from the connecting arm, the shift limit rod being configured to permit or prevent the axial movement of the ultra-low speed shift rod to a position of the ultra-low speed shift stage engagement.

12. The transmission of claim 11, wherein the shift limit rod is aligned with the ultra-low speed shift rod to prevent the axial movement of the ultra-low speed shift rod to the position of the ultra-low speed shift stage engagement.

13. The transmission of claim 1, wherein the ultra-low speed gearbox further comprises:
an output shaft;
an ultra-low speed shift shaft arranged parallel to the output shaft;
a plurality of gears installed respectively on the output shaft and the ultra-low speed shift shaft; and
an ultra-low speed shift shifter which is installed between the plurality of gears of the output shaft and is engaged with the ultra-low speed shift fork.

14. The transmission of claim 13, wherein the output shaft on which the plurality of gears and the ultra-low speed shift shifter are installed, the ultra-low speed shift shaft on which the plurality of gears is installed, and the ultra-low speed shift rod coupled with the ultra-low speed shift fork engaged with the ultra-low speed shift shifter are mounted to a base having at least two support parts so that the ultra-low speed gearbox is configured as one module.

15. The transmission of claim 14, wherein an ultra-low speed gearbox mounting part having an opening of a size corresponding to the base is formed on one side part of a middle casing constituting an exterior of the transmission, and the ultra-low speed gearbox configured as one module is detachably mounted on the ultra-low speed gearbox mounting part.

* * * * *